United States Patent
Kuo (10) Patent No.: US 6,923,575 B2
(45) Date of Patent: Aug. 2, 2005

(54) BALL SPACER AND ROLLING DEVICE USING IT

(75) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 62 days.

(21) Appl. No.: 10/439,705

(22) Filed: May 16, 2003

(65) Prior Publication Data

US 2004/0228560 A1 Nov. 18, 2004

(51) Int. Cl.$^7$ .............................................. F16C 19/20
(52) U.S. Cl. ........................... 384/45; 384/51; 384/521; 74/424.88
(58) Field of Search .............................. 384/51, 43–45, 384/520, 521, 522; 74/89.33, 424.88

(56) References Cited

U.S. PATENT DOCUMENTS

| 852,462 | A | * | 5/1907 | Seubert ........................ 384/522 |
| 1,287,225 | A | * | 12/1918 | Cheney ........................ 384/522 |
| 4,080,018 | A | * | 3/1978 | Traut ............................ 384/522 |
| 4,799,809 | A | * | 1/1989 | Kuroiwa ...................... 384/522 |
| 4,859,090 | A | * | 8/1989 | Smith .......................... 384/463 |
| 6,352,367 | B1 | * | 3/2002 | Konomoto et al. ........... 384/45 |
| 6,415,676 | B1 | * | 7/2002 | Takagi et al. ............... 384/520 |

* cited by examiner

Primary Examiner—Thomas R. Hannon
(74) Attorney, Agent, or Firm—Charles E. Baxley (57) ABSTRACT

The present invention relates to a ball spacer and the rolling device using it. The ball spacer of the present invention makes the ball doesn't touch to his adjoining ball, so as to reduce the noise. Besides, the ball spacer comprises a cylinder surface touching to the ball, so that the spacer can rotate according to the ball and almost hasn't relative motion to his adjoining ball.

6 Claims, 10 Drawing Sheets

BALL SPACER AND ROLLING DEVICE USING IT

FIELD OF THE INVENTION

The present invention relates to ball spacer structure and the rolling device which are applied to prevent interference between adjacent balls, wherein the rolling device comprises ball bearing, ball screw and linear rolling guideway, the rolling ball includes steel ball, ceramic ball and so on.

DESCRIPTION OF THE PRIOR ARTS

Figure 8:
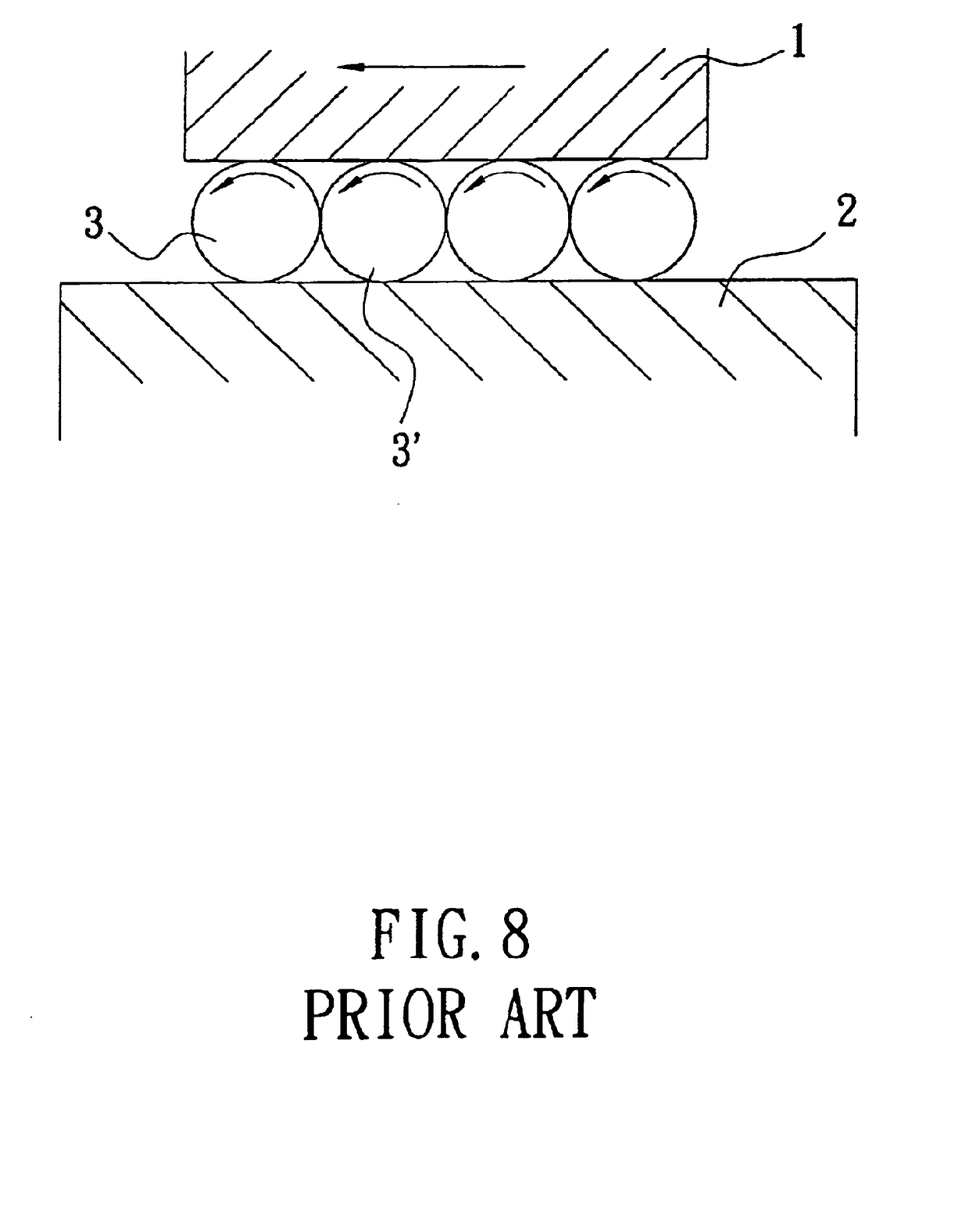
FIG. 8 shows a first type of rolling device of prior arts.

A ball bearing is developed based on the principle that rolling friction is far minor than the sliding friction. For example, ball bearing can make its mating parts rotate relative to a concave surface through rotation of the rolling balls (namely the ball rotating bearing) or move linearly (namely linear ball bearing). Ball screw can enable its mating parts to move helically through rotation of the rolling balls. Linear rolling guideway enables its mating parts to move linearly along the rail. FIG. 8 shows a rolling device of prior art, in which, a moving member 1 moves relative to a fixed member 2, and a plurality of balls 3 are disposed between the moving member 1 and the fixed member 2. When the balls 3 slide left, the moving member 1 will be caused to move right. Although the moving member 1 doesn't contact the fixed member 2 and the friction drag is relatively small, noises and frictions will be produced between the adjacent balls 3, 3' due to they contact directly with each other but move in opposition directions (ball 3 rolls upward while ball 3' rolls downward).

Figure 9:
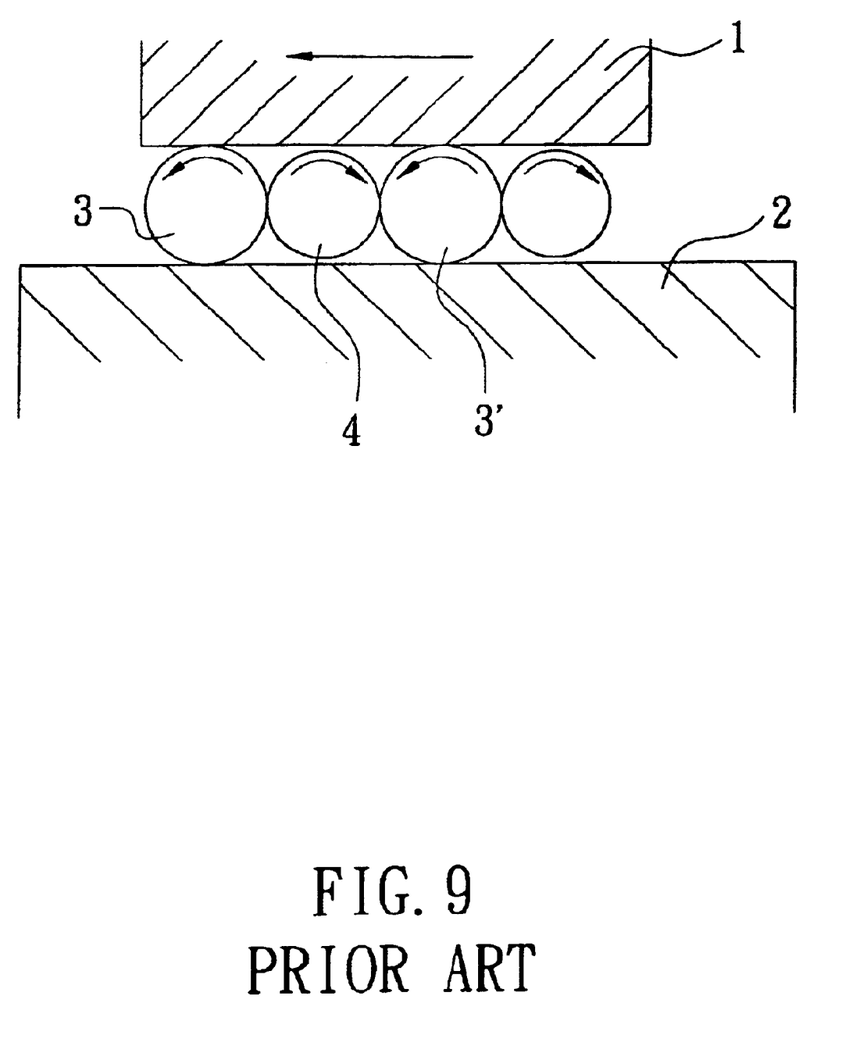
FIG. 9 shows a second type of rolling device of prior arts.

FIG. 9 shows an improved design disclosed by U.S. Pat. No. 5,615,955, wherein a small ball 4 is interposed between the big balls 3, 3', so that the small ball 4 will rotate clockwise when the big balls 3, 3' rotate counterclockwise. In this case, the big balls 3, 3' don't contact each other and almost no relative motion will be caused between the small ball 4 and the big balls 3, 3', the noise and friction can be reduced accordingly. However, the quantity of the big balls 3, 3' are reduced to half, thus, the load capacity of this device is seriously reduced.

Figure 10:
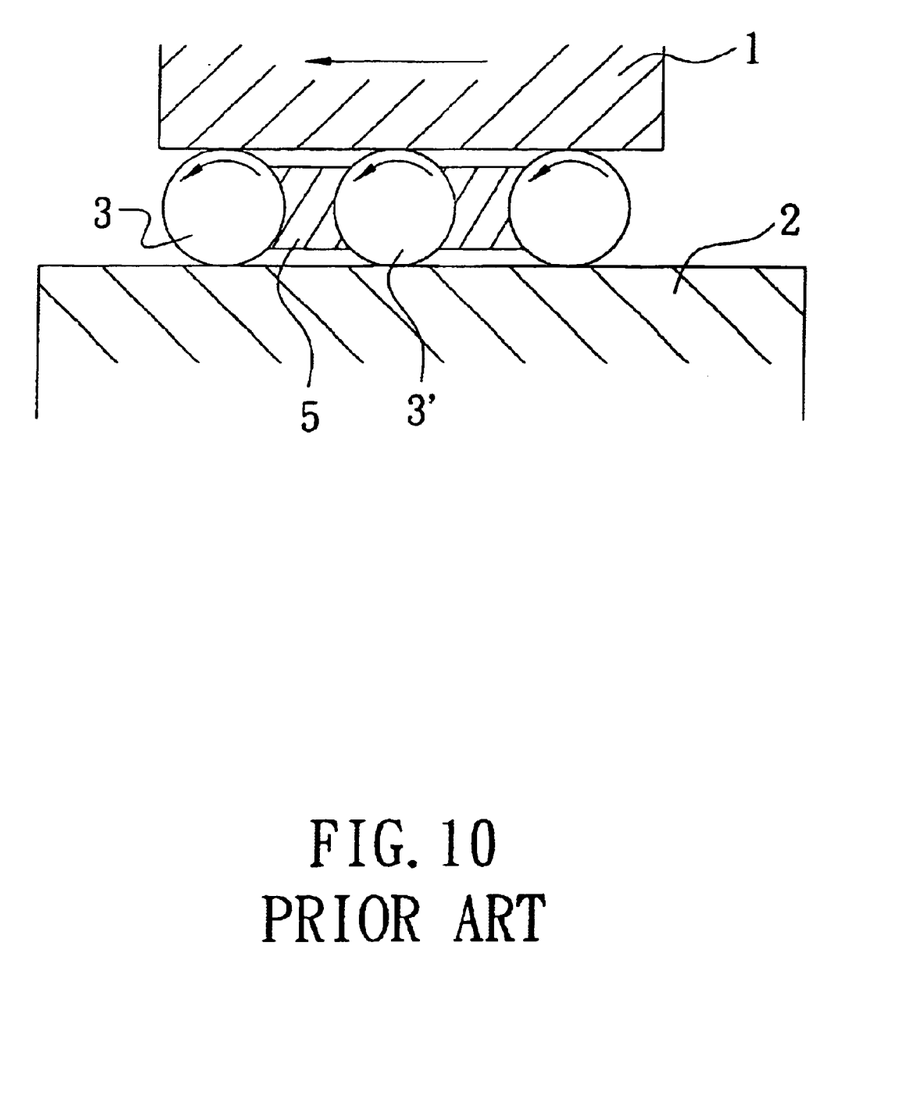
FIG. 10 shows a third type of rolling device of prior arts.

FIG. 10 shows an improved ball spacer structure which is widely used presently. In this ball spacer structure, a spacer-block 5 is interposed between the balls 3, 3'. Due to the balls 3, 3' rotate while the spacer 5 can't rotate, relative motion will be caused between the balls and the spacer 5. Although the balls 3, 3' don't contact with each so that the noise is relative reduced, there is still friction between the balls 3, 3' and the spacer 5.

The present invention has arisen to mitigate and/or obviate the afore-described disadvantages of the conventional ball spacer.

SUMMARY OF THE INVENTION

In accordance with one aspect of the present invention, there is provided with a ball spacer having axial symmetrical concave surface for contacting with the balls, the two adjacent balls are separated from each other and located at both sides of the ball spacer, such that the ball doesn't directly collide with the adjacent one, so as to reduce the collision-caused noise between the adjacent balls.

Due to the ball spacer has axial symmetrical concave surfaces, the ball spacer will in an opposite direction to the rotation of the balls, there is almost no relative motion between the point of contact of the balls and the ball spacer, such that the friction is reduced.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENTS

Figure 1:
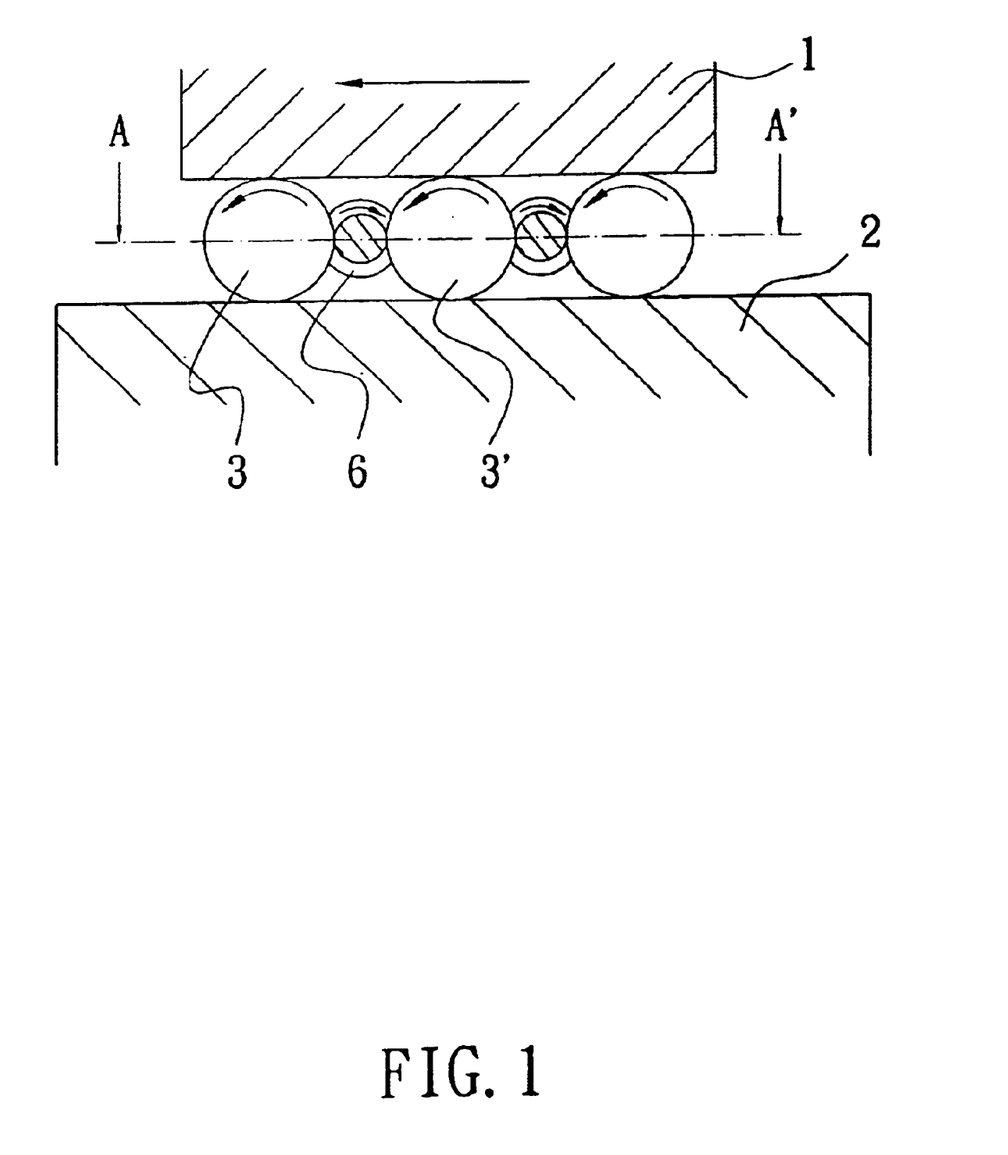
FIG. 1 is a cross sectional view of ball spacer and the rolling device using it in accordance with the present invention.
Figure 2:
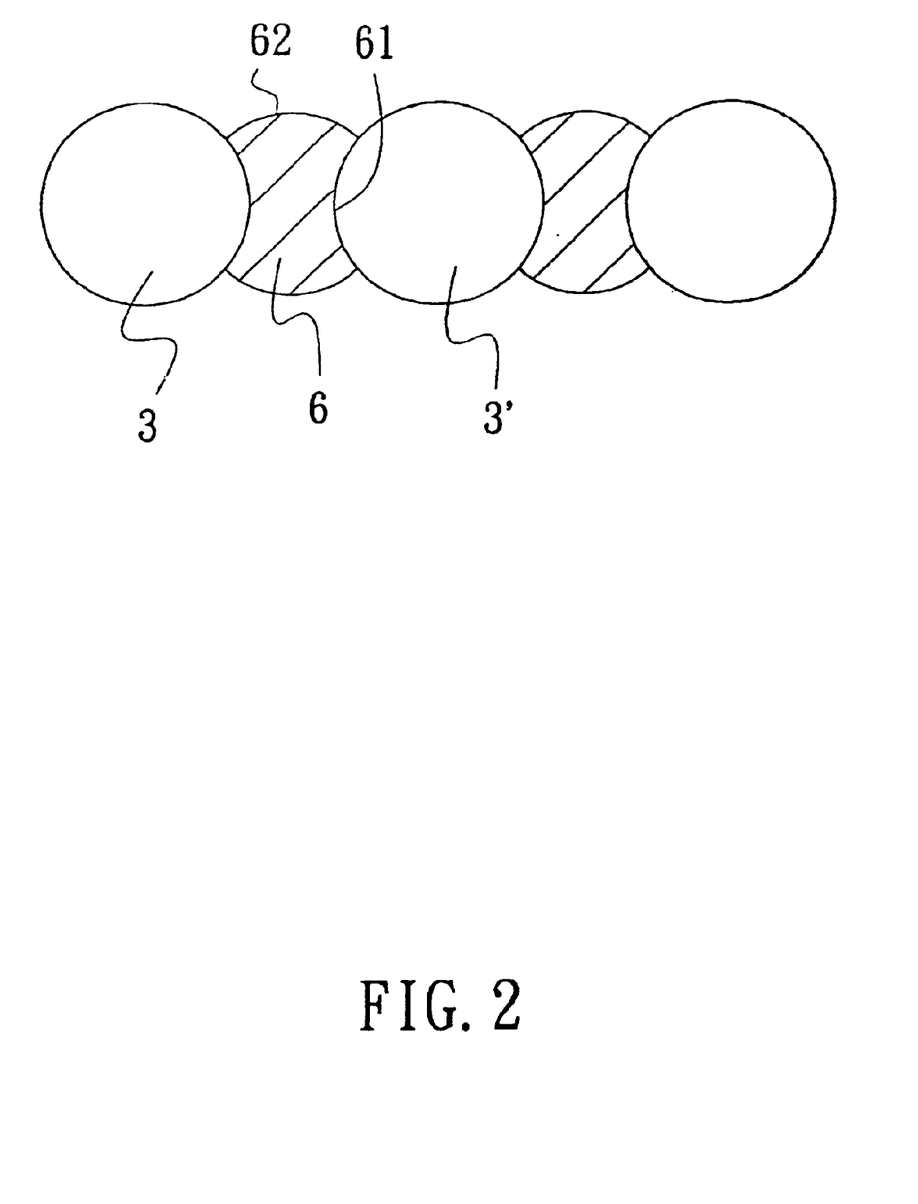
FIG. 2 is a cross sectional view taking along A-A' of FIG. 1.

FIG. 1 is a cross sectional view of ball spacer and the rolling device using it in accordance with the present invention, FIG. 2 is a cross sectional view taken along line A-A' of FIG. 1. Wherein a ball spacer 6 has a concave surface 61 serving to separate ball 3 and ball 3', such that the balls 3, 3' will not collide with each other. As shown clearly in FIG. 1, the ball spacer 6 rotates clockwise when the balls 3, 3' rotate counterclockwise, so that there is almost no relative motion between the point of contact of the balls 3, 3' and the ball spacer 6. Furthermore, the ball spacer 6 is provided with a concave surface 61 which is formed in the shaped of the balls 3, 3', such that volume of the ball spacer 6 is substantially reduced on the premise that the balls 3, 3' don't interfere with each other. Thereby the rolling device of the present invention is able to accommodate more balls 3, 3'. As shown in FIG. 2, both end surfaces 62 of the ball spacer 6 are spherical surfaces which are two portions of the spherical surface of the same sphere. The shape of the ball spacer 6 of the present invention just likes an apple whose outer peripheral portion has been bitten off (also likes a sandglass) and the concave surface 61 exactly resembles the contour of the portion bitten from the apple. Due to both end surfaces 62 are two portions of the same sphere, the ball spacer 6 of the present invention still has the advantages of a sphere. when the ball spacer 6 moves in the rolling track, there will be no apparent interferences between the end surfaces 62 of the ball spacer 6 and the surface of rolling track even if the ball spacer 6 deviates from the rolling track occasionally. Furthermore, if the two end surfaces 62 contact the balls 3, 3' when the intervals between the ball spacer 6 and the adjacent balls 3, 3' are relatively large, the ball spacer 6 will not be jammed but will keep rolling, like a ball, until the concave surfaces 61 of the ball spacer 6 mates with the balls 3, 3' again. In addition, the ball spacer 6 should not be larger than the cross section of the rolling track, the easy way to achieve this is to make the ball spacer 6 slightly smaller than the balls 3, 3'. Thus, the two end surfaces 62 of the ball spacer 6 may be designed as two portions of same sphere whose radius is slightly minor than the radius of the balls 3, 3'.

Figure 3:
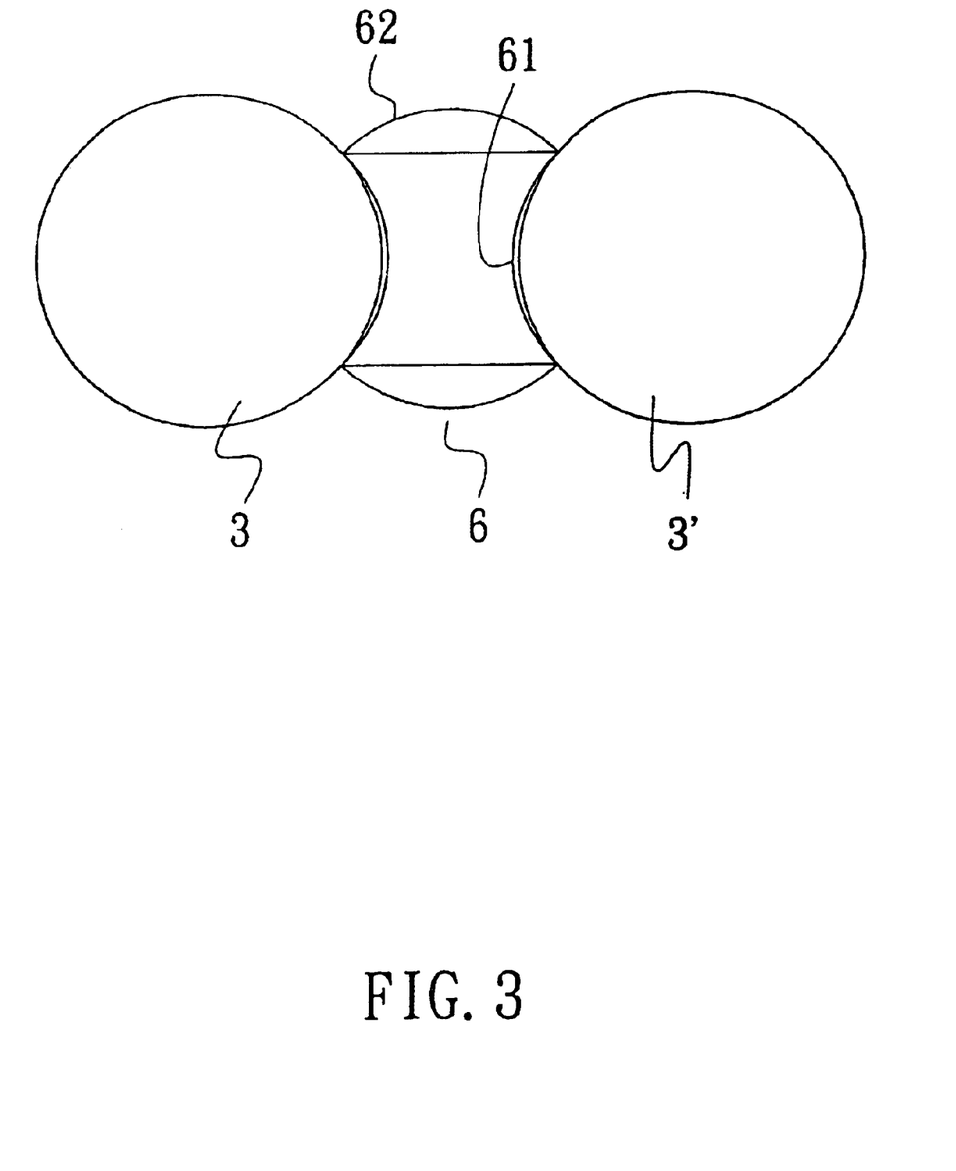
FIG. 3 is an amplified view of the ball spacer and the balls in accordance with the present invention.

FIG. 3 is an amplified view of the spacer and the balls. In which, the intervals between the concave surfaces 61 and the balls 3, 3' are very small so as to diminish the space that the ball spacer 6 occupies. On the other hand, the distance between the balls 3, 3' will be changed when making a turn, thus the ball spacer 6 should be designed to have certain flexibility for permitting some changes in the distance between the balls 3, 3'. The contour of the ball spacer 6 is designed to mate with the balls.

Figure 4:
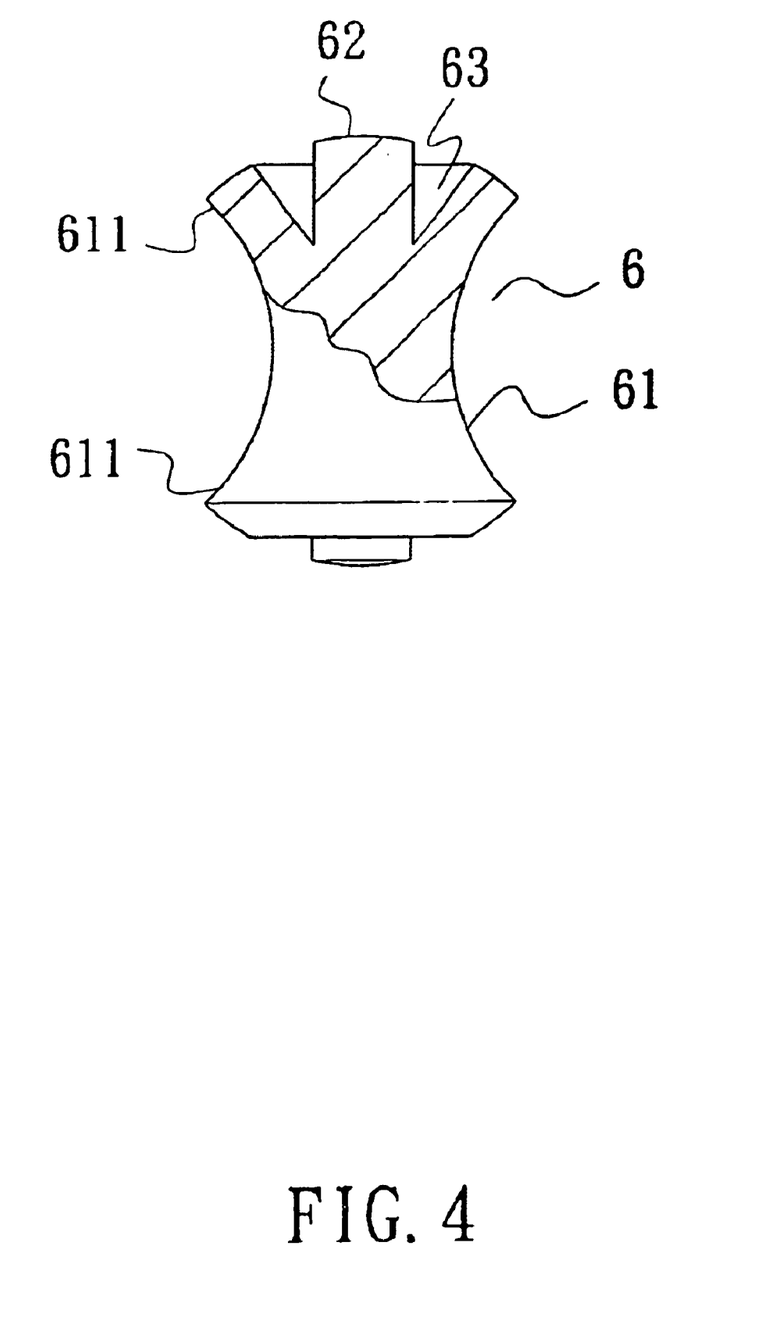
FIG. 4 is a plan view, partly in section, of showing a ball spacer in accordance with a second preferred embodiment of the present invention.

FIG. 4 is a plan view of showing a spacer in accordance with a second preferred embodiment of the present invention. Wherein each of the end surfaces 62 of the ball spacer 6 is provided with an annular groove 63 for increasing flexibility of the ball spacer 6. In case that the end portion 611 of the concave surface 61 contacts the balls, if the distance between the balls 3, 3' changes slightly, the end portion 611 will be more susceptible to bend, thus reducing the load on the balls.

Figure 5:
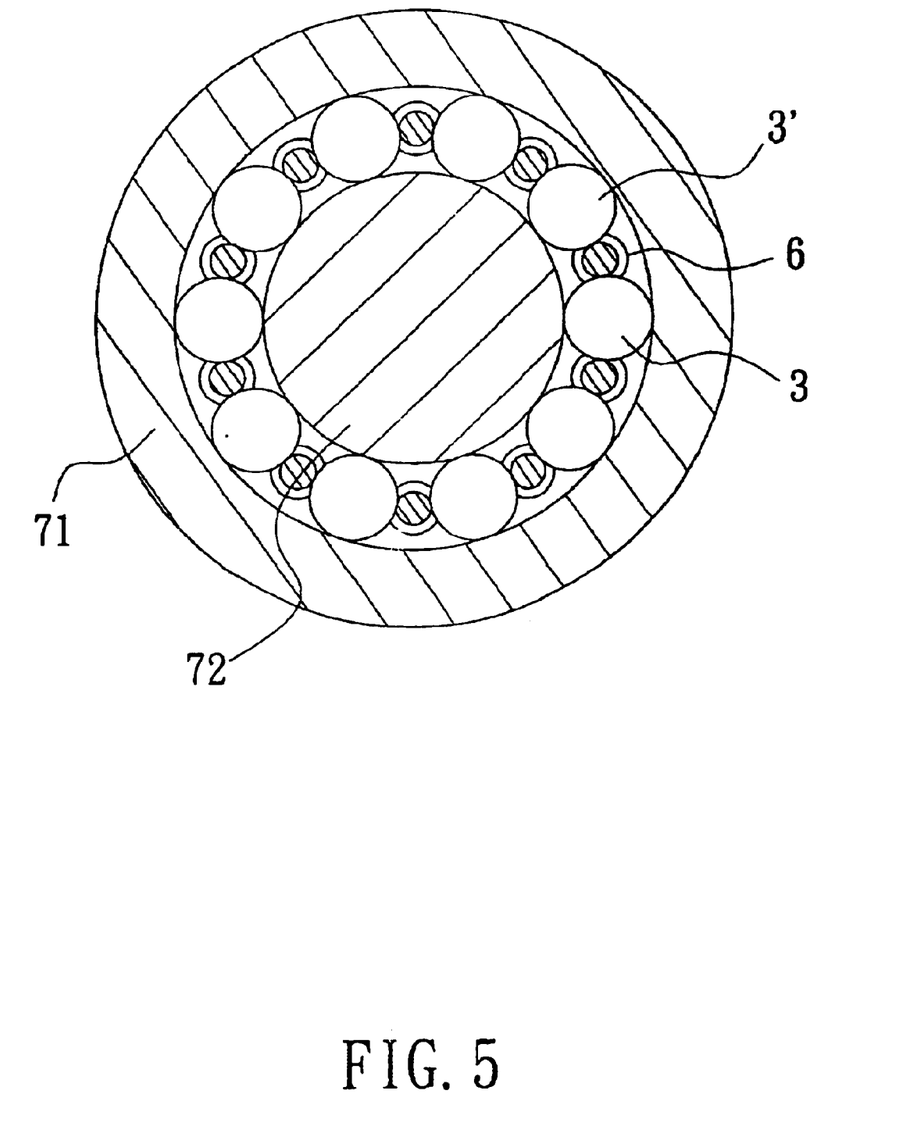
FIG. 5 shows a ball spacer of the present invention applied to a ball bearing.

FIG. 5 shows a ball spacer of the present invention applied to a ball bearing. The ball bearing includes an outer ring 71, an inner ring 72, a plurality of balls 3, 3' and ball spacers 6, wherein the outer ring 71 is provided in the inner surface with an annular rolling track (not shown) and the inner ring 72 is correspondingly provided in the outer surface with an annular rolling track (not shown), the outer ring 71 is mounted to outside of the inner ring 72. The balls 3, 3' are arranged between the outer ring 71 and the inner ring 72 and move therebetween when the outer ring 71 rotate with respect to the inner ring 72. The ball spacers 6 are disposed in the intervals between the balls 3, 3', such that the balls 3, 3' don't contact each other. When the balls 3, 3' rotate, the ball spacers 6 will be caused to rotate in an opposite direction to the balls 3, 3', so that the friction drag between the ball spacer 6 and the balls 3, 3' will be reduced.

Figure 6:
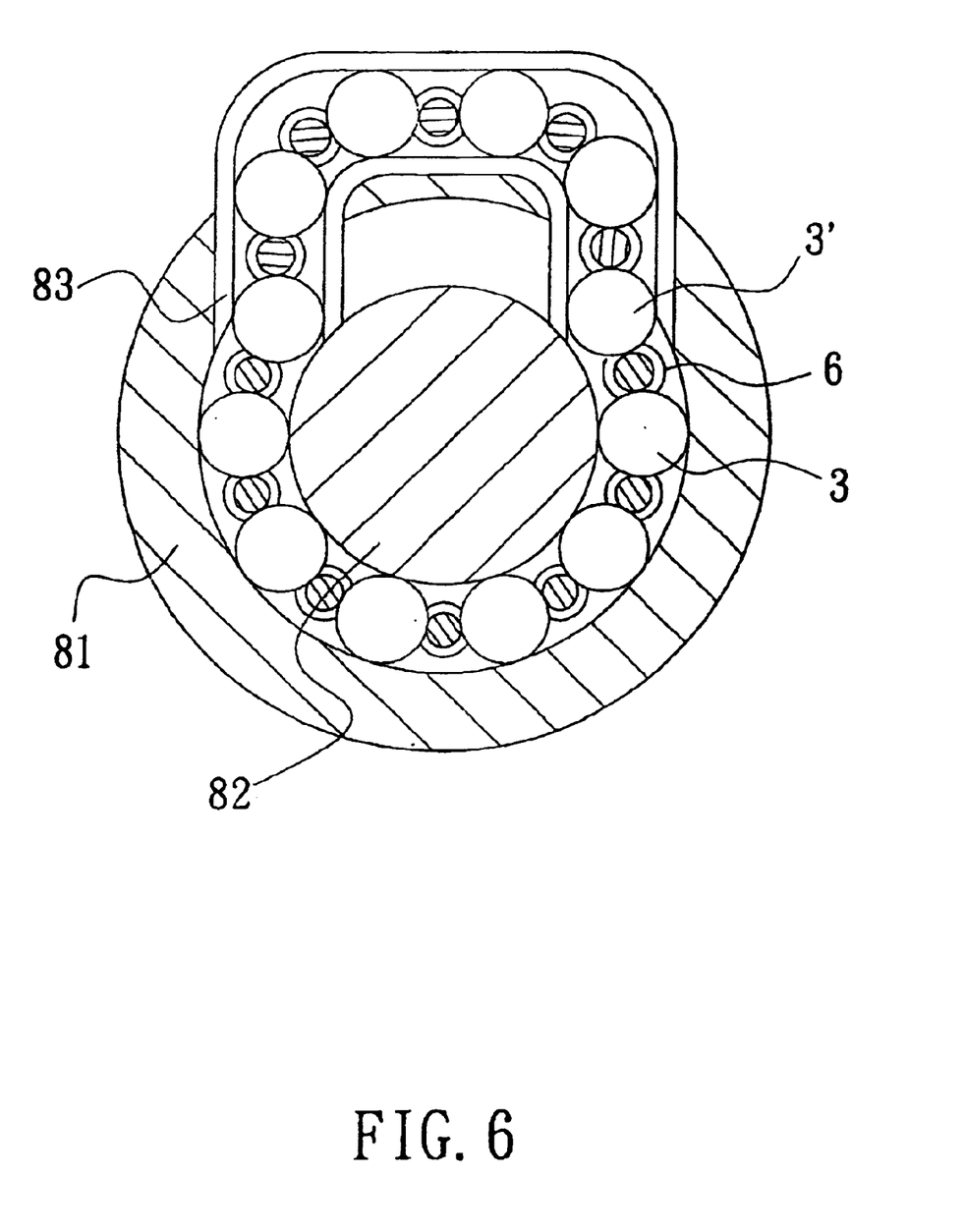
FIG. 6 shows a ball spacer of the present invention applied to a ball screw.

FIG. 6 shows a ball spacer of the present invention applied to a ball screw. The ball screw includes a nut 81, a screw shaft 82, a circulation assembly 82, a plurality of balls 3, 3' and ball spacers 6. Wherein the nut 81 is provided in the inner surface with a helical groove (not shown) and an opposite annular groove (not shown) is correspondingly provided in the outer surface of the screw shaft 82. The balls 3, 3' are helically arranged between the nut 81 and the screw shaft 82 along the helical grooves. When the nut 81 rotates about the screw shaft 82, the balls 3, 3' will be caused to rotate. The ball spacers 6 are arranged in the intervals between the balls 3, 3', such, that the balls don't contact each other directly. When the balls 3, 3' rotate, the ball spacers 6 will be caused to rotate in an opposite direction to the balls 3, 3', so that the friction drag between the ball spacer 6 and the balls 3, 3' will be reduced.

Figure 7:
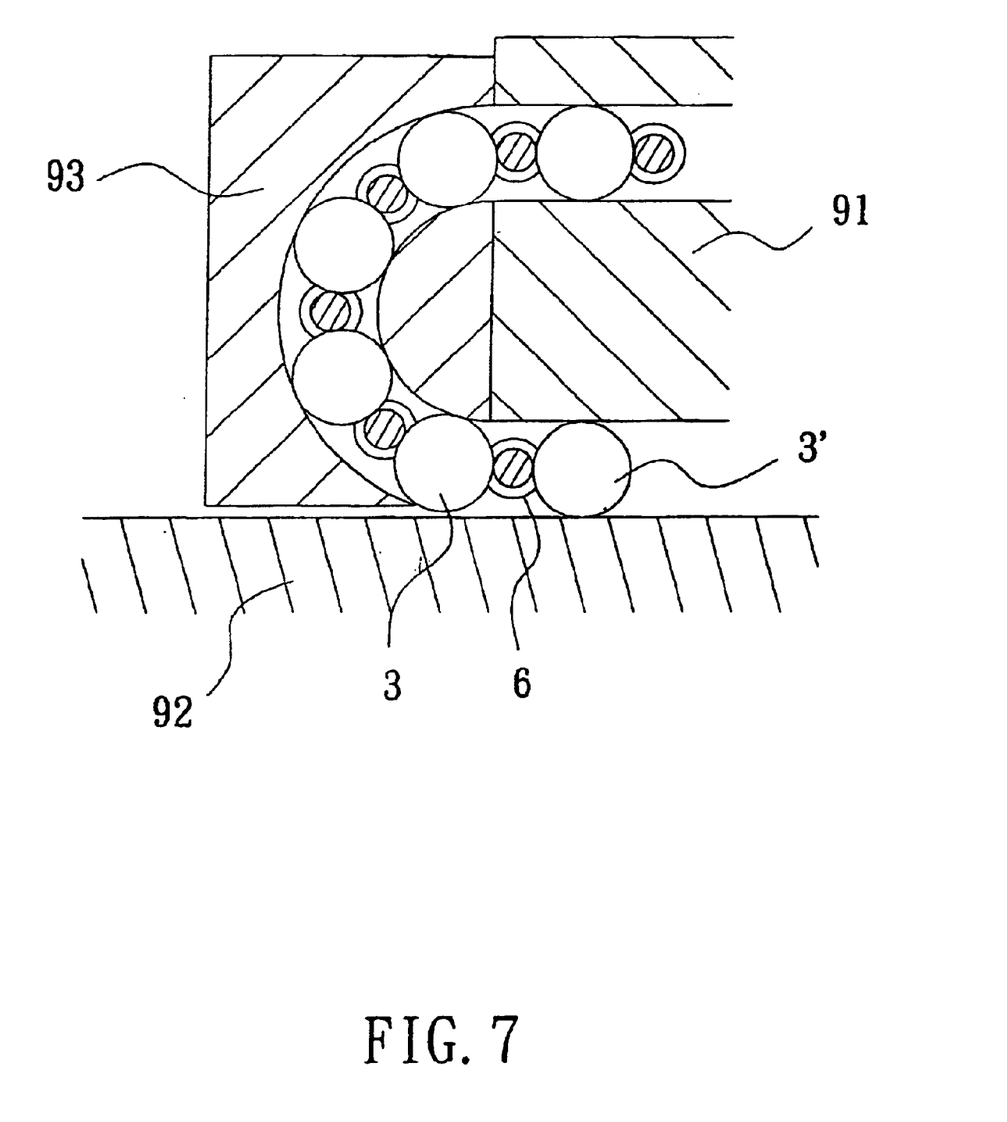
FIG. 7 shows a ball spacer of the present invention applied to a linear rolling guideway.

FIG. 7 shows a ball spacer of the present invention applied to a linear guideway. The linear guideway includes a sliding block 91, a rail 92, a circulation unit 93, a plurality of balls 3, 3' and ball spacers 6. The sliding block 91 is provided in the inner surface with a rolling groove (not shown) and an opposite rolling groove (not shown) is correspondingly defined in the outer surface of the rail 92. The sliding block 91 is mounted on the outside of the rail 92, the balls 3, 3' are arranged between the sliding block 91 and the rail 92 along the rolling grooves. The circulation unit 93 is provided for altering the moving direction of the balls 3, 3'. When the sliding block 91 rotates about the rail 92, the balls 3, 3' will be caused to rotate. The ball spacers 6 are arranged in the intervals between the balls 3, 3', such that the balls don't contact each other directly. When the balls 3, 3' rotate, the ball spacers 6 will rotate in an opposite direction to the balls 3, 3', so that the friction drag between the ball spacer 6 and the balls 3, 3' will be reduced.

In order to adjust the intervals between the ball spacer and the balls, two different sized ball spacers may be used in the same circulation unit. Wherein the diameters of the middle sections of the two ball spacers are different so as to adjust intervals between the ball spacers and the balls.

Due to the ball spacer of the present invention is provided with axially symmetrical concave surfaces that separate the balls from each other, such that the collision and friction between the adjacent paired balls and the noise can be prevented. The concave surfaces of the ball spacer can rotate easily relative to the balls so that almost there is no relative motion between the point of contact of the balls and the ball spacer, and accordingly, the friction is reduced. Furthermore, the concave surface of the ball spacer is thicker at the edges and thin in the middle so as to reduce the spaces that the spacers take, thus, the rolling device of the present invention may accommodate more balls as compared with the conventional ball spacer. The ball spacer is designed to have two spherical end surfaces so as to prevent interferences between the balls and the ball spacer.

While we have shown and described various embodiments in accordance with the present invention, it should be clear to those skilled in the art that further embodiments may be made without departing from the scope of the present invention.

What is claimed is:

1. A ball spacer disposed between two adjacent balls for preventing the balls from contacting with each other;
   the ball spacer provided with a concave surface for separating the two adjacent balls from each other, the concave surface being thick at the edges and thin in the middle whereby to mate with the balls;
   wherein the ball spacer is further provided with two spherical end surfaces which are two portions of the same sphere.

2. The ball spacer as claimed in claim 1, wherein the radius of curvature of the two spherical end surfaces of the ball spacer is minor than that of the balls.

3. The ball spacer as claimed in claim 1, wherein an annular groove defined at both end surfaces of the ball spacer so that the ball spacer will be deformed easily when it is squeezed.

4. A ball bearing comprising an inner ring and an outer ring, a plurality of balls and a plurality of ball spacers, wherein the outer ring is disposed outside of the inner ring, the balls are annularly arranged and rolling between the inner and outer ring, the ball spacers are disposed between two adjacent balls for preventing the collision of them, and the ball spacers are the ball spacers as described in claim 1.

5. A ball screw comprising a screw shaft, a nut, a plurality of balls and a plurality of ball spacers, wherein the nut is helically mounted to the screw shaft, the plurality of balls are helically arranged and rolling between the nut and the screw shaft, the plurality of ball spacers are disposed between two adjacent balls for preventing the collision of them, and the ball spacers are the ball spacers as described in any one of claim 1.

6. A linear guideway comprising a rail, a sliding block, a plurality of balls and a plurality of ball spacers, wherein the sliding block is mounted to the outside of the rail, the plurality of balls roll between the rail and the sliding block along the rail, the plurality of ball spacers are disposed between two adjacent balls for preventing the collision of them, the ball spacers are the ball spacers as described in claim 1.

* * * * *